March 18, 1969  E. A. HARTBAUER ET AL  3,433,136
METHOD AND APPARATUS FOR ACCUMULATING INDIVIDUAL
PLASTIC WEBS INTO STACKS
Filed Nov. 9, 1967  Sheet 1 of 5

INVENTORS.
ELLSWORTH A. HARTBAUER
RUDOLF R. WEIS
ALFRED B. TALBOT

BY *John D. Reep*

ATTORNEY

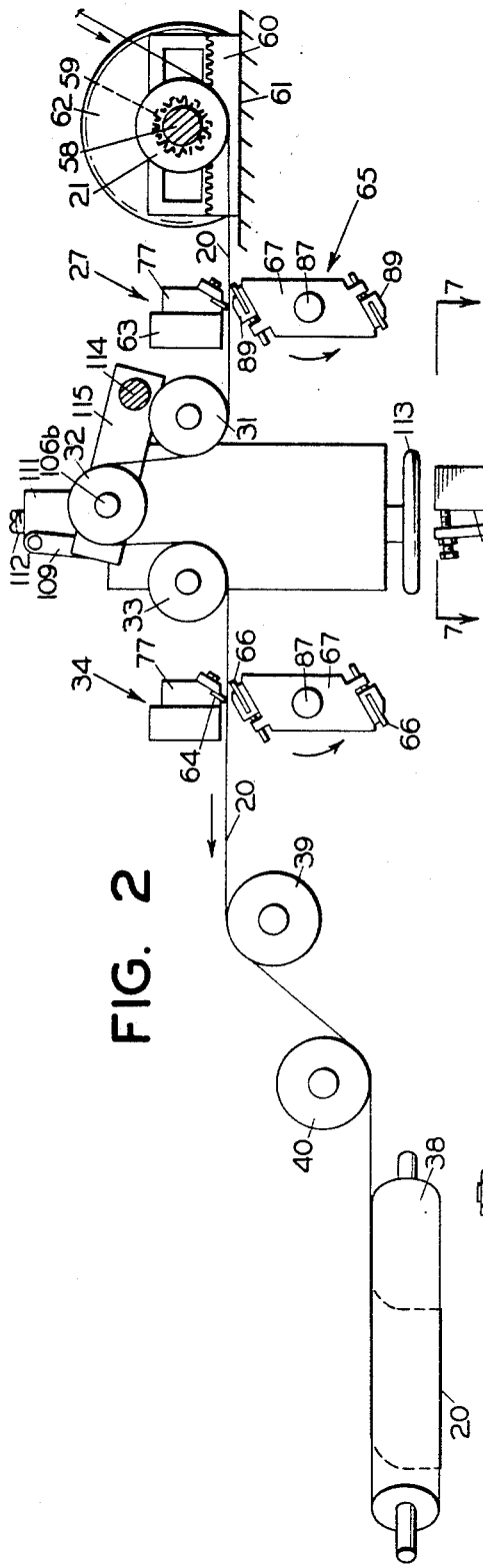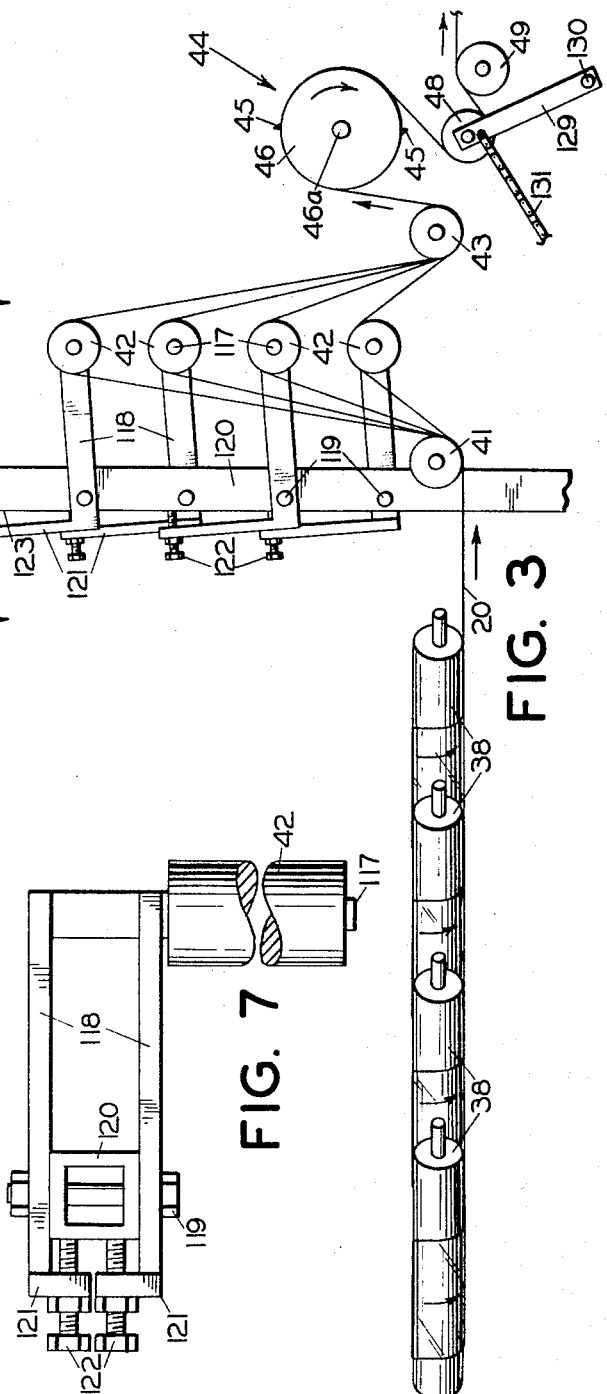

INVENTORS.
ELLSWORTH A. HARTBAUER
RUDOLF R. WEIS
ALFRED B. TALBOT

John O. Reys
ATTORNEY

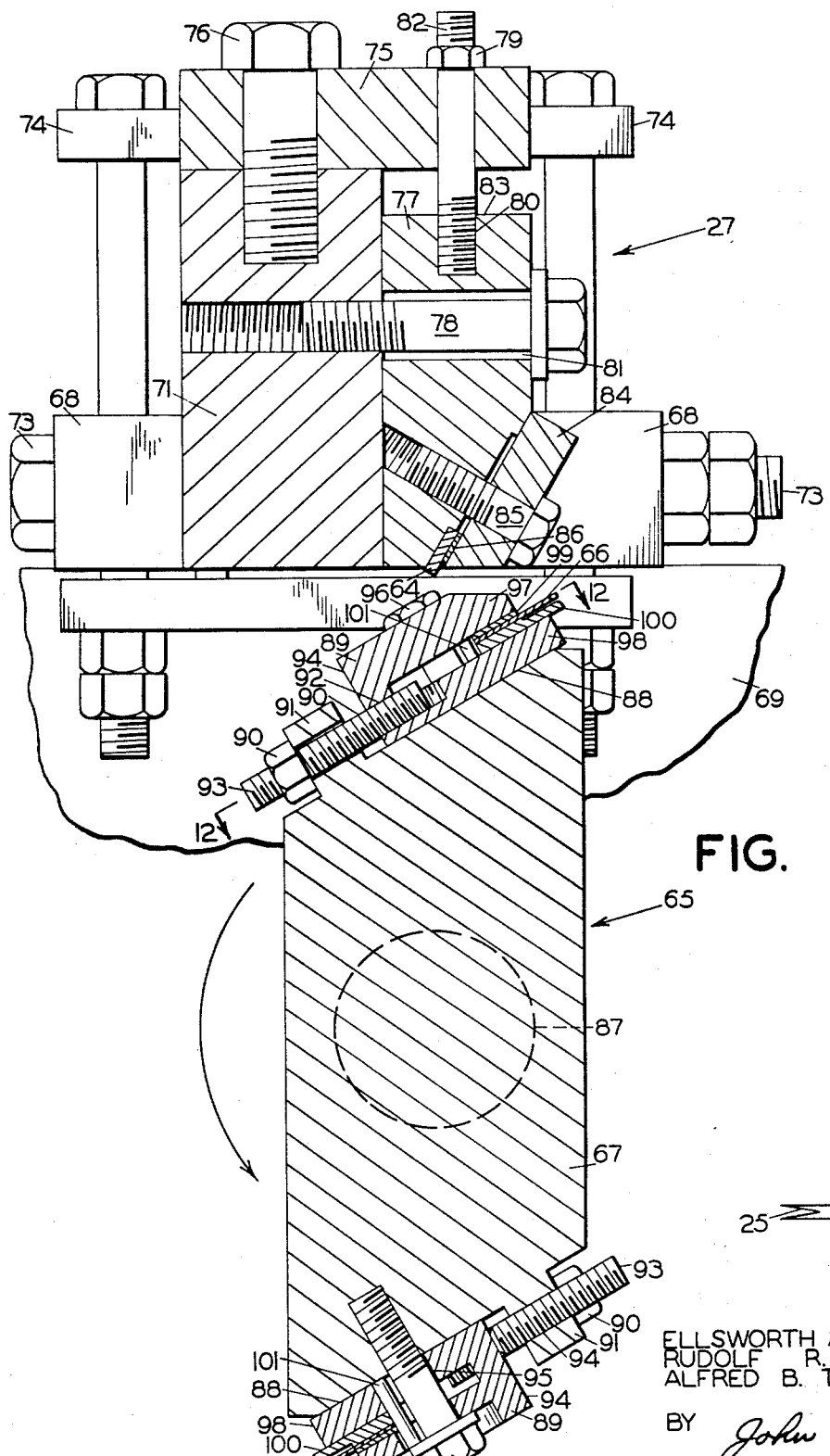

United States Patent Office 3,433,136
Patented Mar. 18, 1969

3,433,136
METHOD AND APPARATUS FOR ACCUMULATING INDIVIDUAL PLASTIC WEBS INTO STACKS
Ellsworth A. Hartbauer, Concord, Alfred B. Talbot, Alamo, and Rudolf R. Weis, Antioch, Calif., assignors to Crown Zellerbach Corporation, San Francisco, Calif., a corporation of Nevada
Filed Nov. 9, 1967, Ser. No. 681,726
U.S. Cl. 93—8
Int. Cl. B31b 1/26; B26f 3/00; B65h 35/10
17 Claims

ABSTRACT OF THE DISCLOSURE

A plurality of flattened tubular plastic webs, each having a plurality of equidistantly spaced transverse seal lines, are concurrently advanced along spaced horizontal paths. While spaced from each other, each of the webs is provided with a pair of transverse perforated lines of weakness adjacent each of the seal lines. One of the lines of weakness of each pair is more easily ruptured than the other. After being perforated, and while still moving, the lines of advancement of the webs are turned 90° so as to stack the webs with corresponding lines of weakness in vertical alignment with each other. The stacked webs are then adhered together by heat-sealing between the lines of weakness in each pair. Then, sequential rupturing along the more easily ruptured lines of weakness provides separated stacks having the individual webs adhered together on one side of the less easily ruptured line of weakness with the web sections on the opposite side of the less easily ruptured line of weakness being free of attachment and including the transverse seal line. Individual web sections in the form of plastic bags can thereafter be separated from the stack by tearing each section along the less easily ruptured line of weakness.

BACKGROUND OF THE INVENTION

The present invention relates to a method of and apparatus for accumulating a plurality of webs of flexible material into separated stacks, each stack containing a section from each of the webs which is readily separable from the stack. While reference is primarily made hereinafter to the method and apparatus as it applies to plastic webs in flattened tubular form which are accumulated into stacks, each stack containing separable individual plastic bag sections, it is to be understood that the invention also has application to accumulating and stacking other flexible webs.

Bags formed of flexible plastic material, such as polyethylene film, have advantages and are being used for such purposes as packaging groceries. In Weis' application Ser. No. 658,517, filed Aug. 4, 1967, entitled "Bag-Forming Machine and Method," and assigned to Crown Zellerbach Corporation, the same assignee as the present application, a method and mechanism are disclosed for continuously forming plastic bags wherein the bags initially form a part of spaced, continually advancing, flattened tubes. Each of the tubes has spaced transverse heat-seal lines which ultimately form bag bottoms. Furthermore, in the Weis application just mentioned, spaced lines of weakness are provided in each tubular web which permit separation of individual bag length sections from the web.

Individual webs which have been formed, for example, in accordance with the teaching of the aforementioned Weis application, could be wound about a tubular core and placed in an appropriate dispenser for dispensing each bag individually. It has been found desirable, however, to provide facility for more rapid dispensing of the bags by accumulating or stacking such individual bag sections into stacks rather than rolling the webs onto a core. This stacking could be accomplished by separating individual bag length sections from each of the webs and then manually stacking the sections on top of each other until a desired number of said sections has been so stacked; but it is difficult to stack individual sections rapidly in proper alignment. One reason for this difficulty is that the material from which plastic bags are formed is extremely flexible, and tends to cling and drape. It should therefore be appreciated that it would be desirable to have a means of automatically accumulating a plurality of plastic web sections into stacks prior to the time when any manual handling of such web sections might be needed. The stacks, each of which includes a plurality of such web sections, would provide greater bulk and be easier to handle. In addition to providing the bulk required for ease of manual handling, a suitable automatic stacking operation increases the speed at which individual tube- or web-forming mechanism may operate without requiring a corresponding increase in manpower because the output from such mechanism may be grouped before any additional manual handling is required.

SUMMARY

It is, therefore, a primary object of the present invention to provide a method and apparatus whereby spaced individual webs of flexible material are vertically aligned with each other while the webs are being advanced and subsequently separated into stacks, each stack containing a plurality of web sections. Individual web sections of predetermined length may thereafter be separated from the stack as desired.

In accordance with one aspect of the present invention, each individual web, prior to stacking, has pairs of spaced transverse lines of weakness formed on the web. One of the lines of weakness of each pair is more easily ruptured than the other line of each pair. After stacking, the stacked webs are adhered together between the two lines of weakness of each pair and then each stack is sequentially separated from the aligned webs by severing the webs along the more easily ruptured line of weakness. Individual sections may then be separated from each of the separated stacks by severing such individual sections along the less easily ruptured line of weakness.

In accordance with other aspects of the invention, method and apparatus are provided for locating the lines of weakness at desired locations with respect to each other and with respect to a transverse seal line which ultimately forms a bag bottom in separated individual sections. In addition, provision is made for assuring that corresponding lines of weakness are vertically in alignment with each other when the webs are stacked.

BRIEF DESCRIPTION OF THE DRAWING

An embodiment of the present invention is illustrated in the accompanying drawings in which:

FIGURE 2 is a sectional front elevational view taken along line 2—2 of FIGURE 1;

FIGURE 3 is an end view taken along line 3—3 of FIGURE 1;

FIGURE 7 is a broken-away plan view taken along line 7—7 of FIGURE 3;

FIGURE 11 is an enlarged sectional view taken on line 11—11 of FIGURE 1;

GENERAL DESCRIPTION

Figure 1:
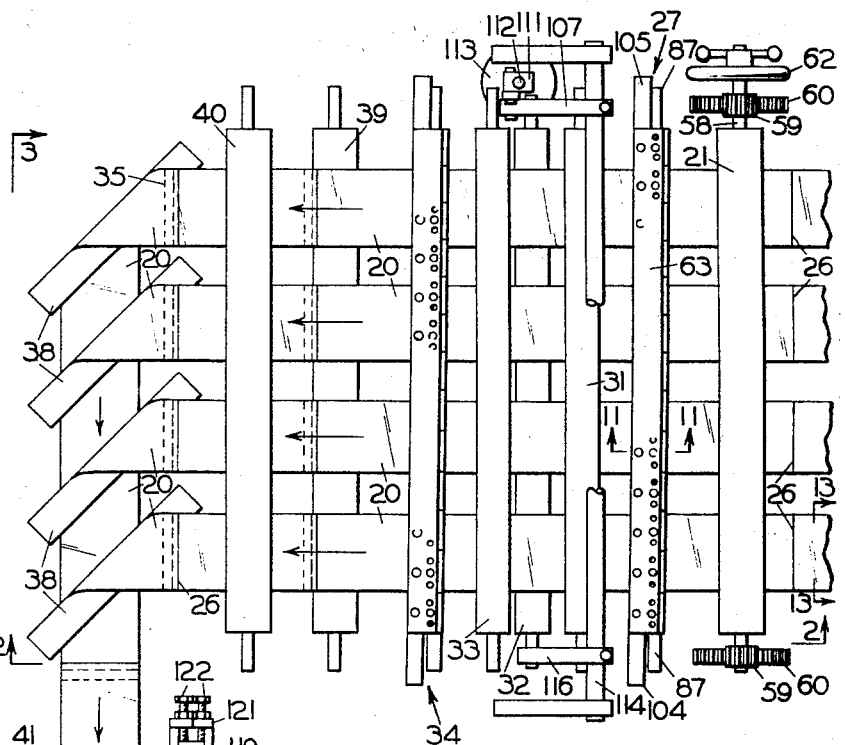
FIGURE 1 is a plan view, mostly diagrammatic, of the apparatus of the present invention.
Figure 9:
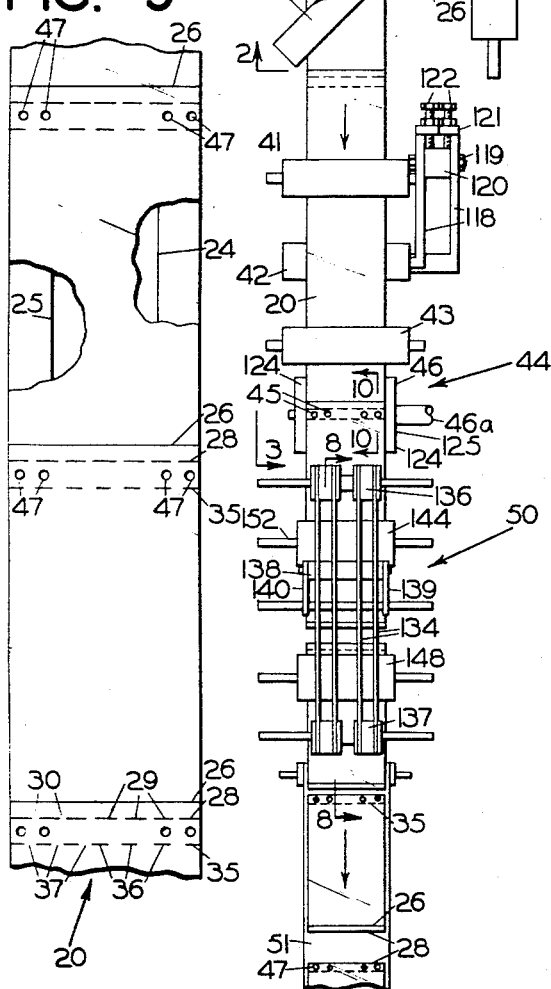
FIGURE 9 is a plan view of the stacked webs as they appear just prior to entering the stack-separating mechanism.

First referring to FIGURES 1 and 2 of the drawing, it is seen that a plurality of individual webs 20 of flexible material, such as polyethylene film, are advanced in the direction of the arrows in contact with, and beneath, a rotating positioning roll 21. Actually, in preferred practice of the present invention, each of the webs is in the form of a flattened tube (FIGURE 13), having a bottom wall 22, a top wall 23, and side gussets 24 and 25. Equidistantly spaced transverse heat-seal lines 26 (FIGURE 9) join the top wall to the bottom wall, and the seal lines 26 ultimately form bottoms for individual bags. As a specific example, the seal lines 26 in each individual web may be separated from each other equidistantly a distance of about 14.25 inches although this distance will vary depending on the size of bags which is desired. Any suitable mechanism may be utilized for initially forming the simultaneously advancing separate webs; however, one particular mechanism which would serve well is the mechanism disclosed in the aforementioned Weis application Ser. No. 658,517.

From the roll 21, the webs, while still spaced, are advanced concurrently through a first perforating station 27 which forms equidistantly spaced transverse lines of weakness 28 across each of the webs 20; consecutive lines of weakness 28 being spaced apart from each other substantially the same distance as consecutive seal lines 26 are separated from each other. Each line of weakness 28 is substantially parallel to the seal lines 26; and, as is clear from FIGURE 9, the lines of weakness 28 are located relatively close to the seal lines so that, in effect, a grouping of lines takes place, each group including a line 26 and a line 28. For example, the distance between lines 26 and 28 in each group may be about 5/8 inch. The line of weakness 28 actually comprises a plurality of aligned perforations 29 separated from each other by unperforated sections 30. As an example, the perforations or slits 29 may each be about 7/16 inch long, and the unperforated sections 30 may be about 1/16 inch long.

From the first perforating station 27, the webs are advanced beneath a guide roll 31; thence around a vertically adjustable roll 32 and beneath another guide roll 33. The vertical adjustability of roll 32 permits adjustment of the distance between lines of weakness formed at the first perforating station 27 and a second perforating station 34.

From the roll 33, the webs 20 are advanced through the second perforating station 34 where second equidistantly spaced transverse lines of weakness 35 are formed across each of the webs, consecutive second lines of weakness being spaced from each other the same distance that the first lines of weakness 28 are spaced from each other. The second lines of weakness are located relatively close to the first line of weakness so that it may be said that each spaced group of lines includes lines 26, 28 and 35. For example, the distance between the lines 28 and 35 in each group may be about 3/4 inch. The second lines of weakness 35 are rupturable by a different tensile force than the first lines of weakness 28 for reasons which will hereafter become apparent. For example, the lines of weakness 35 formed by the second perforating station 34 may be less easily ruptured than the lines of weakness formed by the first perforating station 27. This difference in rupturability may be accomplished, for example, by making perforations or slits 36 in the second lines of weakness a length of 13/32 inch, and the unperforated region 37 a length of 5/32 inch in the second lines of weakness. In other words, the unperforated regions 37 in line 35 may be about 1/32 inch longer than the unperforated regions 30 in the line 28. The examples just given as to length of perforation are not critical, however, so long as one of the lines of weakness is more easily ruptured than the other of the lines of weakness.

From the second perforating station the webs 20 are advanced to web direction changing sleeves 38 after having passed over guide roll 39 and beneath guide roll 40, with the webs contacting the peripheral surfaces of each of the guide rolls just mentioned. The sleeves 38 are to turn each web substantially 90° with respect to its original direction of travel and stack the webs with side edges of each of the webs in vertical alignment with each other.

It is also necessary that the stacked webs have corresponding lines of weakness in vertical alignment with each other. In other words, the more easily rupturable lines of weakness 28 in each web should be vertically aligned with the more easily rupturable lines of weakness 28 in the other webs in the stack. To this end, and as will again be explained in greater detail later, the webs 20 are first advanced as a group beneath a guide roll 41; then individually over a respective vertically adjustable roll 42, there being the same number of rolls 42 as there are webs 20. From the rolls 42, the webs are again brought into surface-to-surface contact by passing the webs beneath a guide roll 43.

The webs 20, which have now been stacked with corresponding lines of weakness in vertical alignment, are contacted by a mechanism 44 for adhering the webs together along spaced locations. This is accomplished by forcing heated pins 45 which project from the surface of drum 46 through each of the stacked webs. This causes portions of adjacent webs to fuse together in the regions adjacent the holes 47 formed by the pins 45 so that the several webs are interconnected in these regions. It is to be noted that the adhered regions are only between the two lines of weakness in each group.

Figure 4:
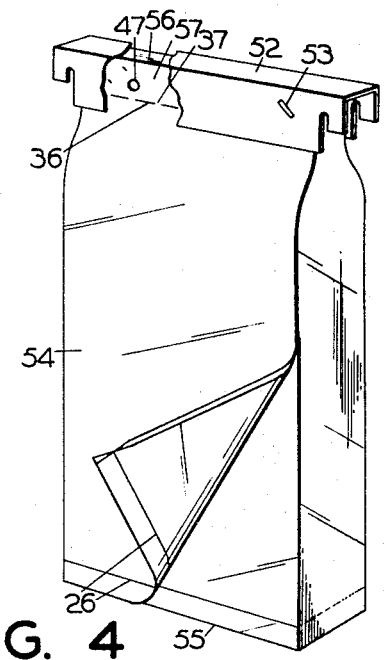
FIGURE 4 is a perspective view illustrating a bag package which may be formed from stacks of web sections, which sections have been stacked in accordance with the present invention.
Figure 8:
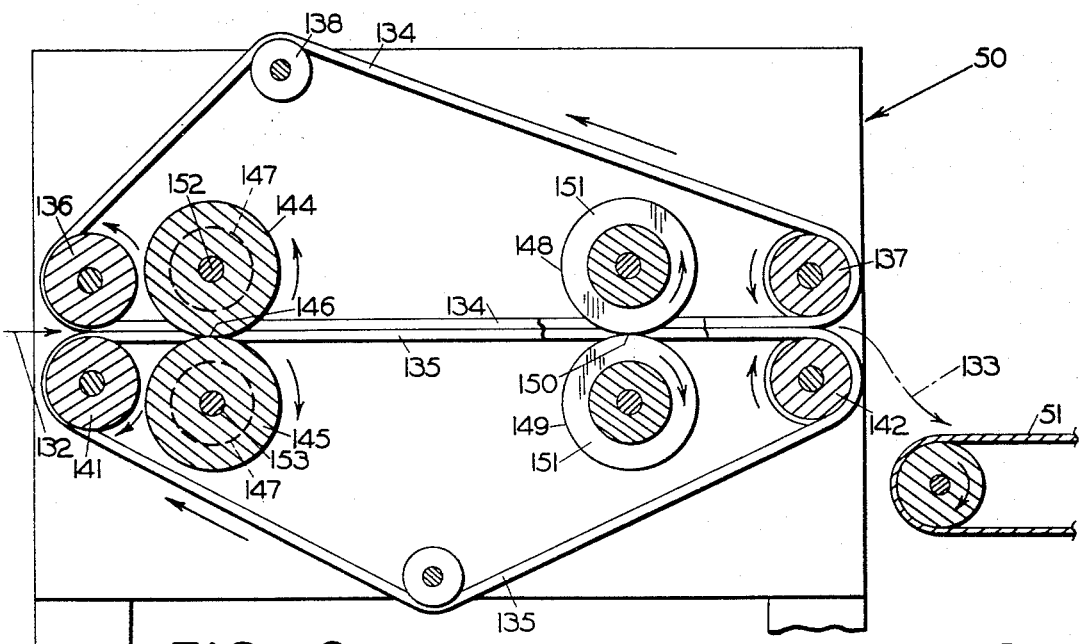
FIGURE 8 is a sectional view taken along line 8—8 of FIGURE 1, with parts omitted for clarity.

From the adhering mechanism 44, the webs travel around a tensioning roll 48 and a guide roll 49 to a stack-separating station 50 (FIGURE 8). The stack-separating station 50 functions to sequentially separate the stacked webs 20 into stacks along the more easily ruptured lines of weakness 28, and then the separated stacks are discharged onto a conveyor 51 for subsequent handling. This subsequent handling may, for example, entail an operator picking up each of the stacks which has been formed in the manner indicated and accumulating the separated stacks into a larger stack. Then, a relatively rigid cardboard header section 52 (FIGURE 4) may be stapled, such as by staples 53, to the top of the larger stack. Individual bags may be separated from this larger stack by gripping the header 52 with one hand and the individual bag with the other hand and then separating the bag by tearing along the less easily ruptured line of weakness 35.

Again referring to FIGURES 4 and 9, it will be observed that by locating the aforementioned grouped arrangement of lines of weakness 28 and 35, seal lines 26 and adhering regions 47 in the manner aforesaid, each separated stack includes an area 54 where the stacked webs are free of attachment between the less easily ruptured line of weakness 35 and one end 55 of the stack, with the webs in each stack being interconnected or attached to each other in the area 57 between the line of weakness 35 and the other end 56 of the stack. The opposite ends of the stack (FIGURE 4) are, of course, the severance lines where the stacked webs have been severed along the more easily ruptured lines of weakness 28. The unattached areas 54 are substantially longer than the attached areas 57 because for most purposes it is the sections in the unattached areas which will be used; the attached sections probably will be discarded. In other words, and in preferred form, the first line of weakness 28 and second line of weakness 35 in each group are spaced from each other a distance less than half the distance between two consecutive first lines of weakness 28. Also, when the webs 20 are tubular as described above to form bags, the heat-seal line 26 is located within and near one end of the unattached area because this heat-seal line forms the bottom wall of an individual separable bag.

It might be noted, however, that it would be possible to reverse the lines of weakness; or, in other words, have the less easily ruptured line of weakness 35 closest to the heat-seal line 26 in each group. If the lines of weakness were so located, the heat-seal line 26 in bags stacked in the arrangement of FIGURE 4 would be located in the end near the cardboard header 52; and, at the opposite end, the bags would be open.

As stated above in connection with the formation of bags, when the horizontally spaced concurrently advancing webs 20 enter the first perforating station 27 they already have equidistantly spaced transverse heat-seal lines 26 applied thereto and, as is clear from FIGURE 1, the lines 26 in the individual webs are substantially in horizontal alignment with each other so that such lines pass into the perforating station 27 essentially simultaneously. It is desirable, however, to provide operative control to permit adjacent of location of the heat-seal lines 26 with respect to the transverse lines of weakness 28 provided at the first perforating station. This operative control is accomplished by mounting a positioning roll 21 in such a manner that the effective distance taken along the length of the web 20 between the heat-sealing station (not shown) and the first perforating station 27 may be adjusted. Such distance adjusting is accomplished by providing supporting structure which permits the axis of roll 21 to be moved in a horizontal direction. Thus, as seen at FIGURE 2, if the roll 21 is moved to the right the effective distance between the line-sealing station and the perforation station is increased, and vice versa if the roll is moved to the left. In further description of the adjusting structure, the roll 21 is journalled for rotation about a shaft 58. Pinion gears 59 are firmly keyed to the shaft near opposite ends of the shaft. These gears 59 are supported on toothed racks 60, with the teeth of the pinion gears meshing with the teeth of the racks. The racks 60 are rigidly mounted on the main frame or platform 61 of the machine. A hand wheel 62 is secured to the shaft 58 at one end thereof. By manually turning the hand wheel, the shaft 58 is moved either to the right or left (as viewed at FIGURES 1 and 2) and so horizontal adjustment of roll 21 may be accomplished. Of course, suitable means are provided for locking the position of the hand wheel once the desired location of the roll 21 has been obtained.

After leaving the surface of roll 21, the individual webs still spaced from each other enter the first perforating station 27.

*Perforating stations*

Referring initially to FIGURES 1 and 2, it is seen that the first perforating station 27 includes a stationary anvil 63 fixedly mounted with respect to the main machine frame, and the anvil includes sections 64 which contact the upper surface of the webs 20 as the webs are being advanced beneath the anvil. The first perforating station 27 also comprises a knife assembly 65 which includes a plurality of perforating knives 66 mounted on opposite sides of a rotating block 67 extending beneath the continuously advancing webs 20. The knives 66, as will be described later in more detail, are of such a nature as to provide equidistantly spaced lines of weakness 28 in the nature of the aforementioned spaced perforations or slits 29 across each of the webs 20 during each period when the knives are forcing the webs 20 against the anvil sections 64 in a shearing action.

Figure 5:
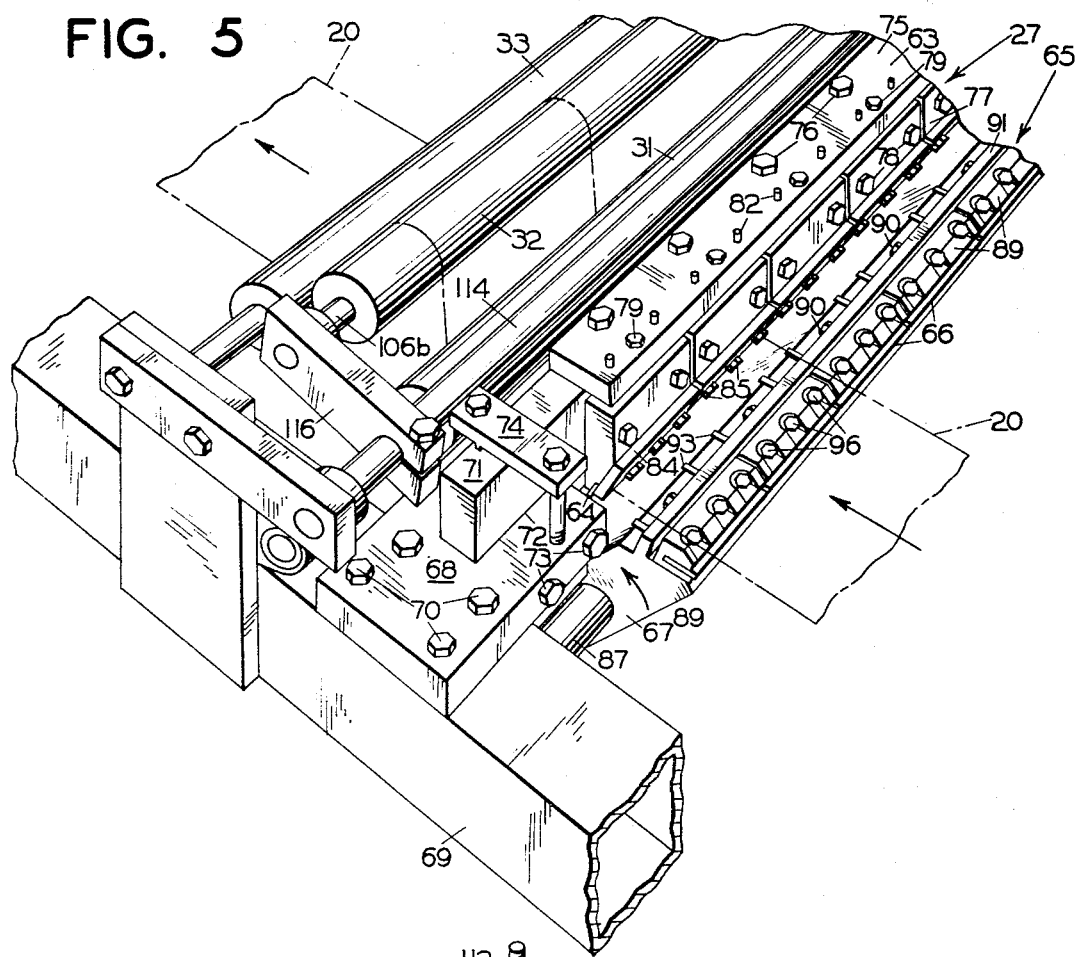
FIGURE 5 is a broken-away perspective view of one end of a perforating station used in the present invention.

Now turning to FIGURES 5 and 11, it is seen that a main anvil assembly securing block 68 is attached to a horizontal machine frame member or platform 69 through the medium of bolts 70 on one side of the machine. It is to be understood that a block (not shown) similar to the block 68 is also attached to a platform or machine frame member on the other side of the machine so that the anvil assembly 63 is firmly supported at each end. A solid supporting beam 71 has the opposite ends thereof received in grooves 72 in each of the blocks 68 and secured therein by bolts 73 passing through the blocks 68 and the beam 71. An anchor plate 74 is bolted to the block 68 over the top of beam 71. An upper connector beam 75 extends along the top of supporting beam 71 and is bolted thereto by bolts 76 or, if desired, the beams 71 and 75 could be made integral such as by welding.

A plurality of aligned anvil support plates 77 are connected to the beams 71 and 75 respectively through the medium of bolts 78 and 79, the bolts 78 being threaded into threaded openings in beam 71, and the bolts 79 extending through an enlarged opening in beam 75 and being threaded into apertures 80 in plates 77. The plates 77 extend beneath beam 75 and in surface contact with one side of beam 71, and the plates 77 are individually vertically adjustable with respect to the beams 71 and 75 for reasons which will hereinafter be pointed out. This adjustability is tolerated by having opening 81 through plates 77 which accommodate bolts 78 larger than the diameter of the bolts 78, as is clear from FIGURE 11. Adjustment of plates 77 is accomplished by turning bolts 79 in an appropriate direction depending on the desired direction of movement after having first loosened bolts 78. Adjustable set screws 82 are threaded through threaded apertures in beam 75 and bear against the top surface 83 of the plates 77 to limit any further upward movement of the plates once they have been set in a desired position. After appropriate adjustment of the plates 77, the bolts 78 are again tightened.

Individual anvil clamp bars 84, corresponding in number to the number of plates 77 function, through the medium of bolts 85, to securely clamp individual anvil sections 64 between each clamp bar 84 and its associated supporting plate 77. There are as many anvil sections 64 as there are plates 77, and a shim 86 is positioned between each anvil section and its associated clamp bar. The anvil sections 64, as seen at FIGURE 11, are generally rectangular in cross section and are formed of steel or other hard metal.

Now turning to a description of the rotating knife assembly 65, the block 67 extends beneath the advancing webs 20, and the block is secured to a central shaft 87 which, in turn, is journalled for rotation in and supported from opposite side machine frame members 69.

As is clear from FIGURES 5 and 11, opposite sides of the block each have a sloping surface 88 upon which knife-carrying members 89 are supported. The members 89 are generally U-shaped in configuration and are secured to the block 67 through the medium of bolts 90 which pass through openings in an upstanding ear 91 which is integral with the block 67. The bolts 90 are threaded into apertures 92 formed in the base of members 89. Individual adjustment of the position of each of the members 89 with respect to surface 88 is accomplished by turning the particular bolt head 90 associated with that member until the member 89 is moved to a desired position and then screwing set screws 93 threaded through threaded openings 94 in the ear 91 into firm engagement with surface 94 on member 89. The adjustable movement is tolerated because openings 95 in the members 89 which receive bolts 96 to attach the members 89 to the blocks 67 are larger than the diameter of the bolts 96. The members 89 are preferably formed of strong metal, but due to the bifurcated configuration there is sufficient resiliency to cause opposite legs 97 and 98 to move together under the tightening action of bolts 96 to securely clamp knife sections 66 between such opposite legs. Shims 99 and 100 bear against opposite knife surfaces, and inward movement of the knives with respect to members 89 is limited by dowel pins 101 passing through the members 89 between opposite legs thereof.

Figure 12:
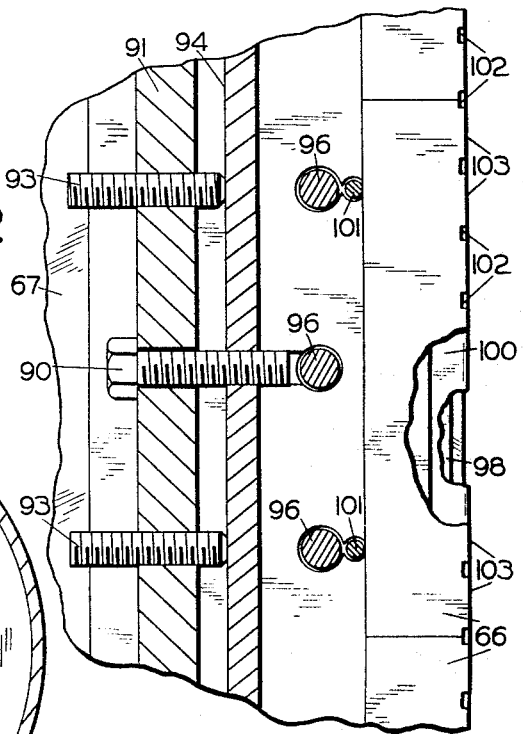
FIGURE 12 is a partial section taken along line 12—12 of FIGURE 11, with parts broken away for clarity; and, FIGURE 13 is a sectional view of an individual web taken along line 13—13 of FIGURE 1.

The knife blades 66 are the same length as the anvil sections 64, and the configuration of each knife blade can be visualized by viewing FIGURE 12. There, it is seen that the edge of each blade which pinches or shears the advancing webs 20 between the blade 66 and anvil 64 includes a plurality of equidistantly spaced grooves 102. The width of the grooves 102 corresponds to the length of the unperforated portions 30 across the line of weakness 28 with the width of the knife edge 103 between each groove 102 corresponding to the length of each perforated portion 29 in the line of weakness 28.

The only difference between the structure of the second perforating station 34 and the first perforating station 27 is in the edges of the knives. The lines of weakness 35 formed at the second perforating station are to be stronger or require greater tensile force to rupture them. As previously mentioned, the length of the unperforated sections 37 in the second lines of weakness 35 is greater than such sections 30 in the first line of weakness 28, and the length of the perforations 36 in the second line of weakness 35 is shorter than such perforations 29 in the first line of weakness 28. To accomplish this difference in rupturability of the weakened lines 28 and 35, the knives used in the second perforating station have wider grooves than the grooves 102 on the knife edges in the first perforating station 27.

It is to be understood that, if desired, it would be possible to use the first perforating station 27 to make the less easily ruptured line of weakness and use the second perforating station 34 to make the more easily ruptured line of weakness simply by reversing the blades between the two perforating stations from the arrangement just mentioned.

It is advantageous to reduce strain on the knives 66 and anvils 64 at the perforating stations 27 and 34 by so associating the parts that all of the perforations or slits in any given line are not formed at the same instant. This strain-reducing may be accomplished, and referring, for example, to the first perforating station, by locating the shaft 87 for the rotary knives on a true transverse line with respect to the longitudinal line of advancement of the webs 20, and locating the supporting beam 71 at a slight angle with respect to this true transverse line. Thus, as seen at FIGURE 1, one end 104 of the supporting beam 71 is located slightly farther along the direction of travel than the opposite end 105 of beam 71. With this arrangement, a knife blade 66 at the end adjacent end 105 of beam 71 will contact the web 20 before the knife blade 66 adjacent end 104 of the beam 71 contacts the web. Because the knives adjacent end 105 may therefore begin cutting before the knives reach their upper vertical limit of travel, accommodation must be made to assure that each of such knives performs a shearing action against its associated anvil 64. This accommodation may be accomplished such as by vertically lowering the anvil sections 64 in decreasing steps between ends 104 and 105 of supporting beam 71. In other words, the anvil nearest end 105 will be lower than the anvil nearest end 104. Inasmuch as the position of the knife blades is also adjustable, this accommodation may also be made by gradually increasing the distance consecutive knife blades are spaced from the axis of shaft 87 between opposite ends of the shaft corresponding to the ends 104 and 105 of beam 71.

Figure 6:
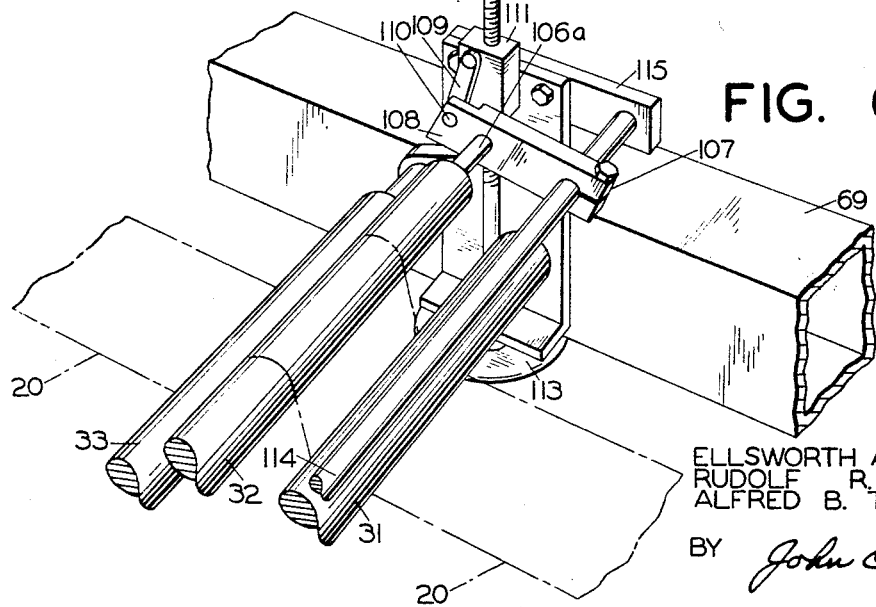
FIGURE 6 is a broken-away perspective view of one end of a vertically adjustable roll mechanism used in the apparatus of the present invention.

As mentioned above, it is desirable to provide means for adjusting the distance between the two lines of weakness 28 and 35 in each group. This is accomplished by passing each web over a vertically adjustable roll 32 between the first and second perforating stations. As seen most clearly at FIGURE 6, the roll 32 is journalled for rotation about a shaft 106, which shaft has one end 32a secured to an arm 107. One end 108 of the arm 107 has a link 109 pivotally secured thereto near one end of the link by pivot pin 110, and the other end of the link 110 is pivotally attached to a vertically movable block 111. The block 111 has a centrally threaded aperture extending therethrough which is threaded onto a threaded shaft 112. The position of the shaft 112 is vertically fixed with respect to main horizontal machine frame element 69, but the shaft is capable of being turned through the medium of a hand crank 113 secured to the lower end of the shaft. Turning the shaft 112 therefore moves the block 111 vertically along the axis of the shaft, and, because the roll shaft or axle 106 is connected to the block 111 (through the medium of link 109 and arm 107), the roll 32 moves vertically with the block 111. In order to move the opposite end 106b of the roll simultaneously with the end adjacent the crank, the end of the arm 107 opposite from the link 109 is securely clamped to a bar 114. The end of the bar is journalled in fixed frame member 115 so that the bar may turn about its axis when such turning movement is supplied thereto by arm 107. Thus, the bar 114 is turned a certain angular distance depending on the distance that the end of the arm 107 adjacent the pivot pin 110 is raised or lowered. This turning movement of the bar is transmitted to the opposite end of roll 32 (see FIGURE 5) because the shaft end 106 at the end of the roll viewed at FIGURE 5 is connected to one end of an arm 116, and the arm 116 is firmly clamped at opposite end to bar 114. Thus, opposite ends of the roll 32 are raised or lowered equal amounts depending on the direction the crank 113 is turned.

*Stacking and aligning station*

From the second perforating station 34, the webs 20 are advanced over guide roll 39 and under guide roll 40, which rolls are secured to respective shafts which are journalled for rotation at opposite ends thereof in fixed machine frame members (not shown). The rolls are rotated at the same speed as the advancing webs, and the roll 39 may be rubber-covered to aid the webs in their longitudinal advancement. From roll 40, the webs are each led over an individual direction-changing sleeve 38. The sleeves 38 are supported from the floor or platform (not shown) and include a highly polished exterior surface which permits the webs 20 to slip thereon with a minimum of frictional resistance. As is clearest at FIGURE 1, the axis of each sleeve is arranged at an angle of substantially 45° with respect to a longitudinal line along the direction of travel of an associated web before the web contacts the sleeve. The webs 20 are each led over and around a respective sleeve 38, and in this manner the sleeves turn each web substantially 90° from its original path of travel. The sleeves 38 thereby function to stack the webs 20 with their side edges in alignment. It may be, however, that the stacked webs do not, at the point of reaching guide roll 41, have the lines of weakness 28 in each web in the stack vertically aligned with the other corresponding lines of weakness 28 in the other webs in the stack. In order to assure that the corresponding lines of weakness of the stacked webs will be vertically aligned, the webs are led from guide roll 41 individually over a respective vertically adjustable idler roll 42.

As seen clearly at FIGURES 3 and 7, each of the rolls 42 is journalled for rotation about a respective shaft. One end of each shaft is secured respectively to an end of an arm 118 of a generally L-shaped lever, there being one lever for each shaft 117. Each arm 118 which carries a shaft 117 is pivotally mounted near the opposite end of the arm from the shaft by a pivot pin 119 to a common vertical frame member 120, the frame member being firmly secured to the floor or platform (not shown). The other arm 121 of each lever extends generally vertically upwardly and has a bolt 122 threaded therethrough near the end thereof opposite from the pivot 119. The end of each bolt bears against a side surface 123 of vertical frame member 120. By turning the bolt 122, its associated lever arm 121 is caused to pivot about pin 119 thereby raising or lowering an attached roll 42 as desired. Thus, a roll 42 second from the bottom may first be raised or lowered to change the effective distance that its associated web 20 travels between guide rolls 41 and 43 (FIGURE 3) and therefore bring lines of weakness in the web 20 second from the bottom into vertical alignment with the corresponding lines of weakness in the bottom web. Similarly, the upper two rolls 42 may be adjusted in a similar manner to align all of the corresponding lines of weakness in all webs.

*Adhering station*

Figure 10:
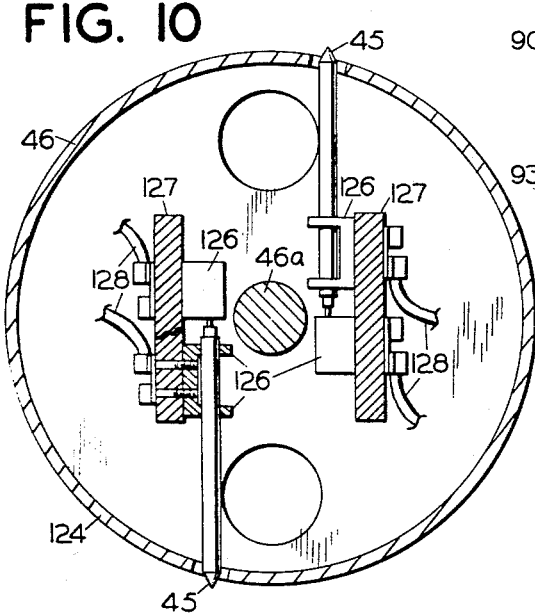
FIGURE 10 is a sectional view of the adhering mechanism taken along line 10—10 of FIGURE 1.

From guide roll 43 the stacked webs, which now have been properly aligned, are brought into surface contact with a drum 46. The drum (FIGURES 1 and 3) is secured to a shaft 46a, which shaft is supported by being journalled for rotation at opposite ends thereof in appropriate side frame members (not shown). The surface of the drum moves at the same speed as the advancing webs. Eight heated pins 45, similar to soldering irons, extend radially a distance of about 3/16 inch from the outer surface of the drum. Four of the pins are aligned with each other in spaced relationship between opposite ends 124 and 125 of the drum along one surface location, and the other four pins are also similarly aligned with each other along a location diametrically opposite from the first mentioned four pins. Referring to FIGURE 10, it may be observed that the pins are appropriately mounted on terminal blocks 126, and the blocks 126 are in turn fixedly mounted on mounting plates 126 secured to opposite ends of the drum. Electrical energy for heating the pins is supplied from electrical conduits 128 which are secured at one end to the terminal blocks 126. The other end of the electrical conduits are appropriately connected to slip rings (not shown) mounted the shaft 46a at one end thereof so that rotational movement of the conduits along with the drum 46 is tolerated. The webs are advanced from the surface of drum 46 beneath a web tensioning guide roll 48 (FIGURE 3). The guide roll 48 is journalled at opposite ends for rotation in support arms 129 (only one of which is illustrated). The support arms 129 at the ends opposite from the roll 48 are pivotally connected at 130 to a fixed frame member. The arms 129 may therefore be pivoted by movement of chain 131 connected to the arm 129 to vary the tension on the webs 20 and to assure that the webs remain in surface contact with the drum 46 for a sufficient period of rotation for the pins 45 to burn through the webs and fuse them together.

The pins 45 are located relative to the position of the webs 20 in such a manner that the pins enter only the region between lines of weakness 28 and 35 in each group. The heat of the pins, as they puncture the webs, causes surface portions of adjacent webs surrounding the aperture 47 made by the pins 45 to fuse together. Thus, the stacked webs 20, after leaving the drum 46, will appear as viewed at FIGURE 9 with regions surrounding holes 47 in adjacent webs secured together. The diameter of the drum is such that one series of four aligned heated pins enters between the weakened lines 28 and 35 in one group, and the diametrically opposed series of four aligned pins enters between the weakened lines 28 and 35 in the next consecutive group.

After leaving the tensioning roll 48, the webs are advanced over guide roll 49, thence to the stack separating station 50.

*Stack-separating station*

Now referring to FIGURES 1 and 8, it is seen that the stacked webs are advanced in the direction of the arrows between an entrance end 132 and an exit end 133 of the stack-separating station 50. The webs are supported and guided through the separating station by upper flexible endless belts 134 and lower flexible endless belts 135. The belts may be formed of leather or suitable synthetic material commonly used for belting. Four upper belts 134 are illustrated in the drawing; however, a greater or lesser number may be used so long as appropriate guiding of the webs 20 is accomplished. Similarly, an appropriate number of lower belts 134 is chosen so as to furnish suitable support for the webs 20 as the webs are advanced through the station 50. The drive for the upper belts 134 is furnished by drive roll 137 positioned near the exit 133 end of the station 50 and around which the belts travel. The belts are in contact with roll 136 to drive the latter roll. The rolls 136 and 137 are suitably journalled for rotation at opposite ends from fixed machine frame members (not shown). An idler roll 138 contacts the bottom surface of the upper belts along the upper reach thereof, and the opposite ends of the idler roll are journalled for support in pivotally adjustable support arms 139 and 140 (FIGURE 1) so that the tension on the belts may be adjusted.

The lower belts 135 are similarly driven by roll 141 positioned at the exit end of the station 50, and an adjustable idler roll 143 is used to adjust tension on the lower belts. Roll 142, near the entrance, is driven by the belts. A pair of compression rolls 144 and 145 provides a first nip 146, through which the webs are advanced shortly after entering entrance end 132 of the separating station. The rolls 144 and 145 are provided with a relatively hard rubber surface so that they will not slip relative to the surface of the webs 20 and so that a suitable compressional force can be exerted on the webs by the rolls without damaging the webs. Spaced circumferential grooves 147 are formed in each of the rolls corresponding in number to the number of belts 134 and 135 which are used. For example, if four upper 134 and four lower 135 belts are used, each of the rolls 144 and 145 have four circumferential grooves therein. These grooves are sufficiently deep to accommodate the entire thickness of a belt 134 or 135 thereby permitting the entire compressional force on the webs to be supplied by the surface of the rolls between the belts; or, in other words, substantially no compressional force is exerted on the webs by the belt surfaces.

A second pair of compression rolls 148 and 149 define a second nip 150 through which the webs are advanced. The second compression rolls are similarly provided with a relatively hard rubber surface and also have spaced circumferential grooves 151 which accommodate the belts and 153, which shafts are supported from and ap-exist in the rolls 148 and 149 because, as will now be pointed out, relative movement of the rolls 148 and 149 with respect to the belts 134 and 135 must be tolerated.

The rolls 144 and 145 are secured to central shafts 152 and 153, which shafts are supported from and appropriately journalled for rotation in the machine platform or frame. Any suitable motor drive may be used to provide such rotation. The rolls 144 and 145 and the belts 134 and 135 are driven at the same speed as the webs 20 are advancing during the operations prior to entering the separating station; in fact, the rolls 144 and 145 provide motive force for the advancement of the webs 20. The rolls 148 and 149 are also journalled for rotation with respect to the machine frame and driven by a suitable motor; however, the rolls 148 and 149 are driven at a speed approximately 30 percent greater than the speed of the rolls 144 and 145.

With the above in mind, it can be appreciated that as soon as a leading edge of a web 20 enters the nip 150 between rolls 148 and 149, the rolls exert a substantial longitudinal tensile force on the webs because of the greater rotational speed of the rolls 148 and 149 relative to rolls 144 and 145. The nip 146 between rolls 144 and 145 is positioned a distance from the nip 150 between rolls 148 and 149 which is greater than the distance between two consecutive more easily rupturable line of weakness 28, and less than twice the distance between two consecutive lines of weakness 28. Thus, when this tensile force is exerted on the stacked webs 20, there is one more easily rupturable line of weakness 28 in the space between the nips 146 and 150. This tensile force causes the stacked webs to rupture along a line 28 between the nips 146 and 150 thereby separating a stack from the advancing webs 20, which stack is deposited on a conveyor 51 for subsequent handling. As soon as such a rupturing or separating takes place, the line of separation becomes the leading edge of the advancing webs 20. As soon as the leading edge reaches the nip 150 between rolls 148 and 149 another stack is separated. Such separation continues until the supply of webs is depleted.

While no supporting structure has been specifically disclosed for many of the rolls illustrated at FIGURE 1, it will readily be understood that such rolls may be conventionally supported at opposite ends thereof from main machine frame members. Furthermore, conventional journalling means may be used for those rolls which are rotated, and such rotational movement may be supplied through gear trains from conventional motors or through appropriately interconnected drive belts.

While the apparatus has been illustrated in connection with the stacking of four webs, similar apparatus may likewise be used for stacking five or more webs depending on the width which it is desired to have in each separable section. Furthermore, the length of the individually separable web section which is formed by the apparatus and method of the present invention is not critical. Thus, for example, to form longer bags, the distance between consecutive seal lines 26 is increased, the distance between consecutive first lines of weakness 28 and between consecutive second lines of weakness 35 is increased, and the longitudinal distance between consecutive adhering regions 47 is also, of course, increased.

While the foregoing specification has set forth an embodiment of the invention in considerable detail for purposes of making a complete disclosure thereof, various other embodiments and modifications will occur to those skilled in the art, but will fall within the spirit and scope of the invention defined in the following claims.

What is claimed is:

1. A method of accumulating a plurality of continuous webs of flexible material into stacks, each stack containing a predetermined number of individually separable web sections of predetermined length, said method comprising:
   (a) simultaneously advancing a plurality of said webs from a supply source along separate horizontally spaced paths;
   (b) forming longitudinally spaced lines of weakness across each of said webs at substantially equidistantly spaced locations transverse to the direction of movement of said webs;
   (c) stacking said webs with said lines of weakness in adjacent webs substantially in vertical alignment with each other while said webs are continuously moving;
   (d) interconnecting said webs by adhering said webs together along relatively narrow adhering regions, each region being spaced longitudinally from said lines of weakness; and, thereafter,
   (e) sequentially separating said stacked webs into stacks comprising predetermined length sections by sequentially severing said webs along substantially equidistantly spaced transverse severance lines, and locating said severance lines so that each stack includes vertically aligned lines of weakness and an adhering region with said web sections being free of attachment to each other between the lines of weakness and one end of the stack, and said webs being adhered together between the lines of weakness and the opposite end of the stack;
   (f) whereby individual web sections may be separated from each said stack along a line of weakness by tearing said individual section from said stack along said line of weakness.

2. The method as set forth in claim 1 wherein said webs are formed of heat-sealable material and adhered together in said adhering region by heat-sealing adjacent portions to each other.

3. The method as set forth in claim 2 wherein said adhering is accomplished by forcing heated needles through said webs to fuse together adjacent portions of said web surfaces in the region defining holes formed by the needles.

4. The method as set forth in claim 1 which further includes locating the severance lines in such a location that the region including the adhering region between the line of weakness and said opposite end of a separated stack is substantially shorter than the remainder of the separated stack.

5. The method of claim 4 wherein each of said webs is tubular in construction and has the opposite walls thereof transversely sealed together at longitudinal intervals spaced substantially the same distance apart as the distance between two consecutive lines of weakness, and wherein the method includes locating the transverse seal within and near an end edge of each separable, individual web section.

6. A method of accumulating a plurality of continuous webs of flexible material into stacks, each stack containing a predetermined number of web sections of predetermined length, said method comprising:
   (a) simultaneously advancing a plurality of said webs from a supply source along separate horizontally spaced paths;
   (b) forming first lines of weakness across each of said webs at substantially equidistantly spaced locations transverse to the direction of movement of said webs;
   (c) forming second lines of weakness across each of said webs spaced from and substantially parallel to said first lines of weakness, said second lines of weakness being spaced from each other the same distance that the first lines of weakness are spaced from each other;
   (d) said first lines of weakness being rupturable by a different tensile force than said second lines of weakness;
   (e) stacking said webs with corresponding lines of weakness in adjacent webs substantially in vertical alignment with each other while said webs are continuously moving, a portion of said webs between each two consecutive more easily ruptured lines of weakness defining said stack;
   (f) adhering said webs together along a region between said first and second lines of weakness so that said webs are interconnected in each stack only on one side of the less easily ruptured line of weakness; and, thereafter,
   (g) sequentially separating said stacked webs into separated stacks comprising predetermined length sections by sequentially severing said webs along said more easily ruptured lines of weakness,
   (h) whereby individual sections may be separated from each said separated stack along the less easily ruptured line of weakness by gripping said stack in the region where said webs are adhered together and tearing said individual section along the less easily ruptured line of weakness.

7. The method as set forth in claim 6 wherein the rupturing along the more easily ruptured line of weakness is accomplished by advancing the stacked webs first through a compression nip defined by first compression rolls moving the webs through the nip at substantially the same speed as the advancement speed of individual webs; thence advancing the webs through a nip defined by second compression rolls rotating in the same direction but at a greater speed than said first compression rolls, said second rolls being capable of exerting sufficient tensile force on said stacked webs to rupture the webs along the more easily rupturable line of weakness.

8. The method as set forth in claim 6 wherein said lines of weakness are formed by perforating said webs along paced transverse points.

9. The method of claim 6 wherein each of said webs is tubular in construction and has the opposite walls thereof transversely sealed together at spaced intervals the same distance apart as the distance between two consecutive first lines of weakness, and wherein the method further includes grouping said lines of weakness and said transverse seal lines so that each group includes a first line of weakness, a second line of weakness, and a transverse seal line in relatively closely spaced relation, there being a relatively long space between consecutive groups; said grouping including locating said first and second lines of weakness on a common side of the transverse seal, and locating said adhering region in each group between said first and second lines of weakness.

10. The method as set forth in claim 9 which further includes locating the more easily ruptured line of weakness between the adhering region and the transverse seal in each group.

11. Apparatus for accumulating a plurality of continuous webs of flexible material into stacks, each stack containing a predetermined number of individually separable web sections of predetermined length, said apparatus including:
(a) means for advancing a plurality of webs from a supply source along separate horizontal paths;
(b) a first perforating station extending across said paths and operative upon said webs for providing first equidistantly spaced transverse lines of weakness in said webs;
(c) a second perforating station extending across said paths and operative upon said webs for providing second equidistantly spaced transverse lines of weakness in said webs, said second lines of weakness being spaced from each other the same distance as said first lines of weakness are spaced from each other, and said second lines of weakness being rupturable by a different tensile force than said first lines of weakness;
(d) said second perforating station being positioned with respect to said first perforating station in such a manner that said first and second lines of weakness are relatively closely spaced together a distance less than one-half the distance between two consecutive first lines of weakness;
(e) means positioned beyond said second perforating station in the direction of travel of said webs for vertically stacking and aligning said webs with corresponding lines of weakness in vertical alignment with each other;
(f) adhering means operative on said webs in the path of travel of said stacked and aligned webs for adhering said webs together only in the area between each two relatively closely spaced first and second lines of weakness;
(g) first compression rolls defining a first nip positioned in the path of said adhered webs and adapted to be operated to advance the webs through the nip at essentially the same speed as the speed of advancement of said individual webs; and
(h) second compression rolls defining a second nip positioned in the path of said adhered webs beyond said first nip, said second nip being positioned a distance from the first nip greater than the distance between two consecutive more easily ruptured lines of weakness and less than twice the distance between two consecutive more easily ruptured lines of weakness, said second rolls being adapted to be operated at a speed advancing the webs through the second nip greater than the speed of the first rolls whereby said second compression rolls provide tensile force to rupture the webs sequentially along each of the more easily ruptured lines of weakness to form stacks of web sections.

12. The apparatus as set forth in claim 11 which further includes a vertically adjustable roller contacting said individual webs between said first and second perforating stations for adjusting the distance between said first and second lines of weakness.

13. The apparatus as set forth in claim 11 which further includes endless top and bottom guide belts supported for extension between said first and second nips for guiding the webs between said nips.

14. The apparatus as set forth in claim 11 wherein said means for stacking and aligning said webs includes sleeve means contacting each of said webs at an angle with respect to the movement of said webs for turning the direction of travel of said webs substantially 90° to stack the individually moving webs.

15. The apparatus as set forth in claim 11 wherein said webs are formed of heat-sealable material and wherein said adhering means includes a plurality of heated pins projecting from the surface of a drum, and means for forcing the advancing webs into contact with the drum surface through a portion of travel sufficient to cause said pins to burn through said webs and fuse portions of said webs surrounding said pins together.

16. The apparatus as set forth in claim 11 wherein each perforating station comprises a stationary anvil contacting one surface of each of the webs, and a rotary knife having a perforated edge operative against the opposite surface of each web, said knife being adapted to perforate said web against said anvil along spaced locations across said webs.

17. The apparatus as set forth in claim 16 wherein one of the elements including the anvil and knife at each perforating station is positioned so as to contact said webs along a transverse line substantially 90° with respect to a longitudinal line extending in the direction of travel of said webs, and the other of the elements including the anvil and knife is positioned so as to contact said webs at a slight angle with respect to the transverse line of contact of the other element whereby the perforating of a web adjacent one end of each cooperating anvil and knife is accomplished before the perforating of another web adjacent the opposite end of each cooperating anvil and knife.

References Cited
UNITED STATES PATENTS 2,733,061 1/1956 Crafts _____ 270—52
3,057,527 10/1962 Hannon _____ 225—100

BERNARD STICKNEY, Primary Examiner.

U.S. Cl. X.R.

225—96, 100; 270—52; 340—266